(12) United States Patent
Yamasaki (10) Patent No.: US 10,379,342 B2
(45) Date of Patent: Aug. 13, 2019

(54) VEHICULAR HEAD-UP DISPLAY DEVICE

(71) Applicant: CALSONIC KANSEI CORPORATION, Saitama (JP)

(72) Inventor: Naomi Yamasaki, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 15/511,055

(22) PCT Filed: May 19, 2015

(86) PCT No.: PCT/JP2015/064332
§ 371 (c)(1),
(2) Date: Mar. 14, 2017

(87) PCT Pub. No.: WO2016/042838
PCT Pub. Date: Mar. 24, 2016

(65) Prior Publication Data
US 2017/0307883 A1 Oct. 26, 2017

(30) Foreign Application Priority Data
Sep. 18, 2014 (JP) ................ 2014-190165

(51) Int. Cl.
*G02B 27/10* (2006.01)
*G02B 27/14* (2006.01)
(Continued)

(52) U.S. Cl.
CPC .......... *G02B 27/0101* (2013.01); *B60K 35/00* (2013.01); *B60K 37/02* (2013.01);
(Continued)

(58) Field of Classification Search
CPC ................ G02B 27/0101; G02B 27/01; G02B 2027/0118; G02B 27/0149;
(Continued)

(56) References Cited

U.S. PATENT DOCUMENTS 5,859,714 A 1/1999 Nakazawa et al.
2010/0073773 A1* 3/2010 Hotta ................ G02B 27/01
359/630

(Continued)

FOREIGN PATENT DOCUMENTS

| CN | 102147531 A | 8/2011 |
| CN | 102314315 A | 1/2012 |

(Continued)

OTHER PUBLICATIONS

English translation of International Search Report from Application No. PCT/JP2015/064332 dated Aug. 25, 2015 (4 pages).

*Primary Examiner* — Brandi N Thomas
(74) *Attorney, Agent, or Firm* — Calfee Halter & Griswold LLP (57) ABSTRACT

To provide a head-up display apparatus capable of displaying an easily visible image. The apparatus projects a display image displayed on the image displaying part installed in an instrument panel of a vehicle toward a windshield glass (translucent member) through an opening of the instrument panel, reflects the image on the windshield glass, and displays character information and symbol information as a virtual image, which is visible from a predetermined eye-position range. The character information is displayed in a first area where a difference in distortion (binocular parallax) of the virtual image is less than a predetermine value when the translucent member is seen from the predetermined eye-position range.

4 Claims, 9 Drawing Sheets

(51) Int. Cl.
*G02B 27/01* (2006.01)
*B60K 35/00* (2006.01)
*B60K 37/02* (2006.01)

(52) U.S. Cl.
CPC ...... *G02B 27/01* (2013.01); *B60K 2350/1072* (2013.01); *B60K 2350/2043* (2013.01); *B60K 2350/2052* (2013.01); *G02B 2027/011* (2013.01); *G02B 2027/0129* (2013.01); *G02B 2027/0145* (2013.01)

(58) Field of Classification Search
CPC ........ G02B 2027/012; G02B 2027/011; G02B 2027/0154; G02B 2027/0138; G02B 2027/014; G02B 2027/0159; G02B 26/0816; G02B 27/48; G02B 2027/0145; G02B 2027/0127; G02B 2027/013
USPC .................................................. 359/619–633
See application file for complete search history.

(56) References Cited

U.S. PATENT DOCUMENTS

| | | |
|---|---|---|
| 2011/0199198 A1 | 8/2011 | Yang et al. |
| 2012/0008048 A1 | 1/2012 | Sekine et al. |
| 2012/0218295 A1 | 8/2012 | Hashikawa et al. |
| 2013/0021224 A1 | 1/2013 | Fujikawa et al. |
| 2013/0188259 A1 | 7/2013 | Nakamura et al. |
| 2013/0194674 A1 | 8/2013 | Horiuchi et al. |

FOREIGN PATENT DOCUMENTS

| | | |
|---|---|---|
| CN | 102596627 A | 7/2012 |
| EP | 818701 A2 | 1/1998 |
| EP | 2405404 A2 | 1/2012 |
| EP | 2618202 A1 | 7/2013 |
| JP | 10-963 A | 1/1998 |
| JP | 2003-025871 A | 1/2003 |
| JP | 2005-003918 A | 1/2005 |
| JP | 2008-285105 A | 11/2008 |
| JP | 2010-76533 A | 4/2010 |
| JP | 5370427 B | 2/2013 |
| JP | 2013-156584 A | 8/2013 |
| JP | 2012-32811 A1 | 2/2016 |
| WO | 2012/036098 A1 | 3/2012 |
| WO | 2012035623 A1 | 3/2012 |

\* cited by examiner

VEHICULAR HEAD-UP DISPLAY DEVICE

CROSS-REFERENCE TO RELATED APPLICATIONS

This application is the 371 application of PCT Application No. PCT/JP2015/064332, filed May 19, 2015, which is based upon and claims priority to Japanese Patent Application No. 2014-190165, filed Sep. 18, 2014, the entire contents of which are incorporated herein by reference.

TECHNICAL FIELD

This invention is related to a vehicle head-up display apparatus, which displays desired information in front of a driver by forming a virtual image.

BACKGROUND ART

Recently, a vehicle head-up display apparatus is commercialized. With the apparatus, a display image is projected to a vehicle windshield glass and forms a virtual image in front of a driver of the vehicle. As a result, the driver can visually recognize the display image without averting his/her eyes from the front while driving the vehicle.

In such a vehicle head-up display apparatus, a virtual image is displayed on a curved windshield glass, causing distortion of the virtual image. To overcome such a deficiency, Patent Literature 1 teaches a technique to reduce distortion of a virtual image by modifying optical parameters of the optical system for projecting the virtual image.

CITATION LIST

Patent Literature

Patent Literature 1: JP 5,370,427 B

SUMMARY

Technical Problem

The vehicle head-up display apparatus taught by Patent Literature 1 is capable of relatively easily reducing the distortion of the display image if the driver sees the image with one eye. However, it is difficult for the apparatus to reduce the distortion of both virtual images for the right and left eyes and to generate a virtual image having little distortion when the driver sees the virtual image with both eyes. That is, the distortion of the virtual images displayed in an area having a large curvature (i.e., in a curved-surface area having a smaller curvature radius) is not sufficiently reduced when seen by both eyes, resulting in a bad visibility.

In such a vehicle head-up display apparatus, when the magnification of the display image is increased to move the image forming position forward, the display area is, unavoidably, overlapped with the curved-surface area of the windshield glass. Therefore, the distortion of the display image caused by the curve of the windshield glass, specifically a difference in distortion between the virtual images seen by the left eye and by the right eye is increased. As a result, the quality of the display image is remarkably low when the formed virtual image is seen by both eyes.

An object of this invention is, therefore, to solve the above-described problem. To be specific, the object of the present invention is to provide a vehicle head-up display apparatus that selects a type of information to display in accordance with a difference in distortion between a virtual image seen by a right eye and a virtual image seen by a left eye, such that the apparatus can display an easily-visible virtual image regardless of the difference in the distortion generated when the image is seen by both eyes.

Solution to Problem

To achieve the object, a vehicle head-up display apparatus according to the invention includes an image displaying part that is installed in an instrument panel of the vehicle and a translucent member that is provided in a front part of a cabin of the vehicle. The apparatus is configured to project a display image displayed on the image displaying part toward the translucent member through an opening of the instrument panel, to reflect the projected display image on the translucent member, and to display character information and symbol information as a virtual image. The virtual image is visible from a predetermined eye-position range. The character information is displayed in an area where binocular parallax of the virtual image is less than a predetermine value when the translucent member is seen from the predetermined eye-position range.

Advantageous Effects

The vehicle head-up display apparatus according to the present invention displays the character information, which requires a high display quality, in an area having less binocular parallax of the virtual image seen from a predetermined eye-position range. That is, the display information is appropriately disposed or displayed in accordance with the binocular parallax of the virtual image (i.e., a difference in distortion between the virtual images seen by a right eye and by a left eye).

DESCRIPTION OF EMBODIMENTS

First Embodiment

Hereinafter, embodiments of a vehicle head-up display apparatus in the present invention will be described with reference to the drawings.

Figure 1:
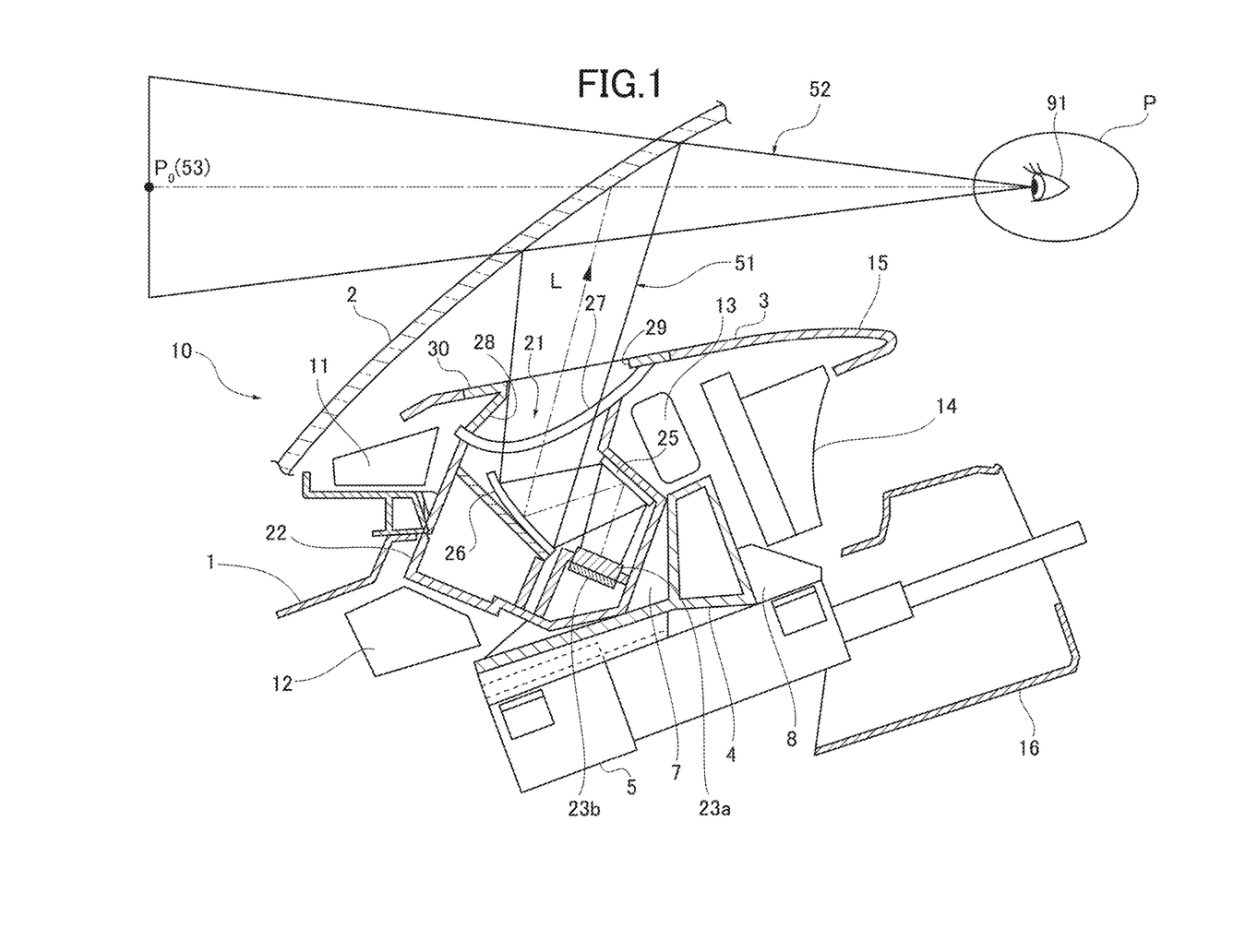
FIG. 1 is a sectional view illustrating an instrument panel installed with a vehicle head-up display apparatus according to First Embodiment of the present invention.

FIG. 1 is a sectional view illustrating a structure of a vehicle head-up display apparatus 21 according to First Embodiment. First, an entire configuration of the vehicle head-up display apparatus 21 is described with reference to FIG. 1.

[Description of Entire Configuration of Vehicle Head-Up Display Apparatus]

As illustrated in the sectional view of FIG. 1, a vehicle-interior front panel 1 and a windshield glass 2 (a translucent member) are provided in a front part of a cabin of a vehicle. Further, an instrument panel 3 is provided under the windshield glass 2 so as to cover the vehicle-interior front panel 1.

Inside the instrument panel 3, a vehicle body strength member 4 is installed in a rear side (in the right side on the paper in FIG. 1) of the vehicle 10 in the vehicle-interior front panel 1. That is, the vehicle body strength member 4 extends in a vehicle width direction (a direction orthogonal to the paper of FIG. 1). Under the vehicle body strength member 4, a non-illustrated column bracket is provided to attach a steering column 5. The column bracket (not illustrated) is divided to a column lower-bracket 7 positioned on a front side of the vehicle 10 and a column upper-bracket 8 positioned on the rear side of the vehicle 10. The steering column 5 is fastened and fixed to the column lower-bracket 7 and column upper-bracket 8 respectively by a fastening tool such as bolts and nuts.

Inside the instrument panel 3 (to be specific, on the upper side thereof), air-conditioning ducts 11 and 12, a harness (a bundle of electric wires) 13, an instrument device 14, and the like are provided in order from the front side of the vehicle 10. Further, a meter hood 15 is integrally or separately provided with the instrument panel 3 to cover the upper part of the instrument device 14. Additionally, a column cover 16 is attached to a projected portion on the steering column 5 which is projected from the instrument panel 3 toward the rear side of the vehicle 10. Note that arrangements of the components provided inside the instrument panel 3 differ depending upon vehicles, and the above described configuration should be thus considered as a mere example.

The vehicle-interior front panel 1 is provided under the windshield glass 2 (a translucent member) and includes, for example, a dash panel for partitioning the cabin and an engine room. The vehicle body strength member 4 is made of metal or light alloy metal and has a noncircular cross-section (e.g., a rectangular cross-section). The air-conditioning duct 11 is a duct that blows air-conditioning air against the windshield glass 2 to prevent the window from fogging (i.e., functions as a defroster duct). The air-conditioning duct 12, on the other hand, is a duct that blows air-conditioning air toward the passengers (i.e., functions as a ventilator duct).

The vehicle head-up display apparatus 21 is installed in a space inside the above-described instrument panel 3. To be specific, the apparatus 21 is attached to a position between the air-conditioning duct 11 and the harness 13 and above the column lower-bracket 7. Above the vehicle head-up display apparatus 21, the instrument panel 3 is cut out to form an opening 29 between the windshield glass 2 (the translucent member). A light flux 51 emitted from the vehicle head-up display apparatus 21 to form a virtual image passes through the opening 29 and guided to the windshield glass 2.

The vehicle head-up display apparatus 21 includes a casing 22, a dust cover 27, a finisher 30, and a standing wall part 28. The casing 22 surrounds a displaying part and an image-forming optical system which form a virtual image. The dust cover 27 is provided to close the casing 22. The finisher 30 is then installed above the dust cover 27. The standing wall part 28 is formed as a part of the finisher 30 and stands upward from the vicinity of the vehicle front side edge of the dust cover 27 along the right-and-left direction of the vehicle 10.

Next, a detailed configuration of the vehicle head-up display apparatus 21 will be described. The casing 22 of the vehicle head-up display apparatus 21 includes an image displaying part 23a, an illuminating part 23b, optical-path forming parts 25 and 26, the dust cover 27, and the standing wall part 28. The image displaying part 23a includes a liquid-crystal panel for displaying an image and/or a video. The illuminating part 23b includes a plurality of LEDs to illuminate the image displaying part 23a from the back surface. The optical-path forming parts 25 and 26 reflect the image displayed on the image displaying part 23a along the arrow L and then guides toward the windshield glass 2.

The optical-path forming parts 25 and 26 include a reflection mirror (a single or a plurality of flat mirror(s) or convex mirror(s)) and a concave mirror. The reflection mirror guides the image displayed on the image displaying part 23a toward the windshield glass 2. It should be noted that the number and/or types of the optical parts included in the optical-path forming parts 25 and 26 should not be limited to the above-mentioned configuration and are appropriately selected in accordance with the design thereof.

Further, the image displaying part 23a may be, instead of the liquid-crystal panel, configured by a Digital Light Processing (DLP) system in which a display image is generated by scanning the light emitted from the LEDs using micro-mirrors, or configured by a laser system in which a display image is generated by scanning the light emitted from a laser light source. However, both the DLP system and the laser system require, in addition to the optical-path forming part 25 and 26, a screen for projecting the display image.

The light flux 51 emitted from the image displaying part 23a and passed through the opening 29 is reflected on the windshield glass 2 (the translucent member), and the reflected light flux 52 is reflected toward a driver's eyeball 91. By extending the reflected light flux 52 toward the outside of the vehicle through the windshield glass 2, the driver recognizes that the image displayed on the image displaying part 23a is formed as the virtual image 53 at a position $P_0$ ahead from the windshield glass 2 by a predetermined distance. Although the positions of the driver's eyeballs 91 differ individually, they are practically positioned within a predetermined eye-position range P. Therefore, the vehicle head-up display apparatus 21 is designed such that the virtual image 53 is recognizable to the driver from the predetermined eye-position range P.

[Description of Method for Measuring Distortion of Virtual Image]

Next, a method of calculating distortion of the virtual image 53, which is displayed by the vehicle head-up display apparatus 21, is described with reference to FIGS. 2 to 5.

Figure 2:
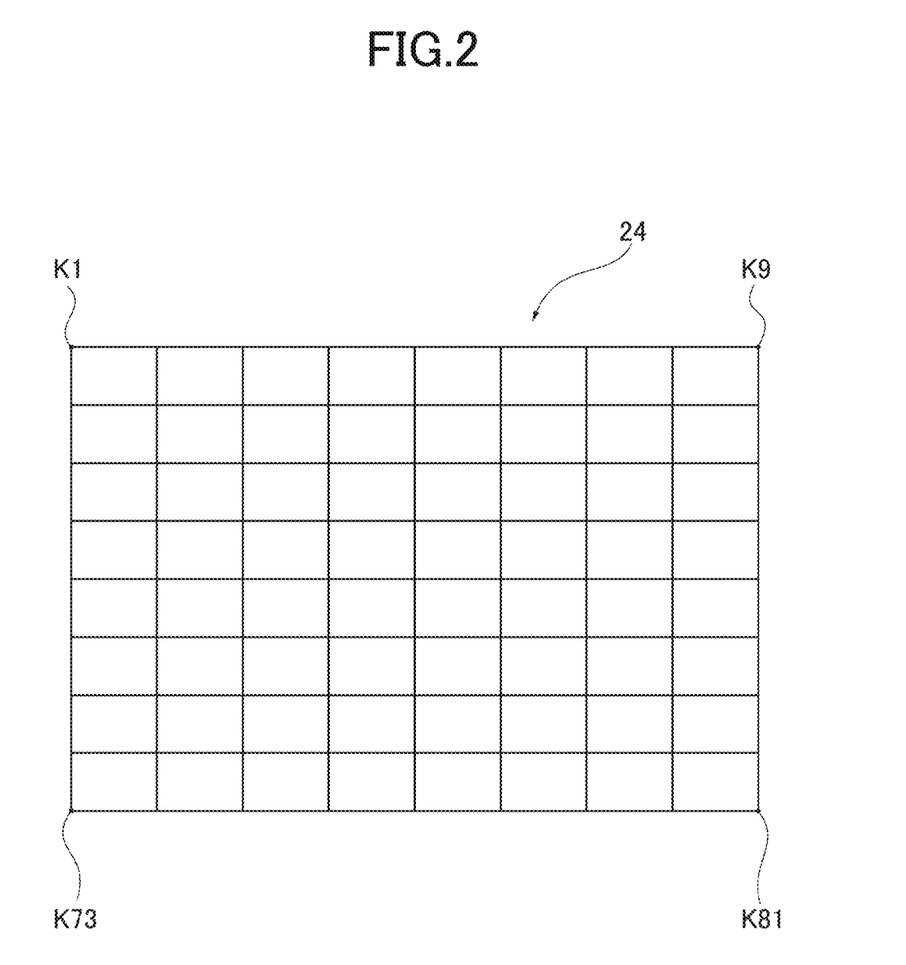
FIG. 2 is a view illustrating a projection pattern to quantifying distortion of a visual image displayed by the head-up display according to First Embodiment of this invention.

FIG. 2 is a view illustrating a projection pattern 24 that is displayed on the image displaying part 23a and projected onto the windshield glass 2. The projection pattern 24 is used to quantify the distortion of the virtual image displayed by the vehicle head-up display apparatus 21. As illustrated in FIG. 2, the projection pattern 24 has a lattice shape in which a plurality of longitudinal and lateral lines is arranged orthogonal to each other to have a plurality of intersections. In the example shown in FIG. 2, the projection pattern 24 has, in order from the left to right and up to down, eighty-one lattice points K1, . . . , K9, . . . , K79, . . . , K81. Here, the number of the lattice points of the projection pattern 24 should not be limited to eighty-one, but should appropriately be determined. Further, the projection pattern 24 should not be limited to that shown in FIG. 2. The projection pattern 24 may be, instead of the lattice shape, a dot shape being regularly arranged longitudinally and laterally.

Figure 3:
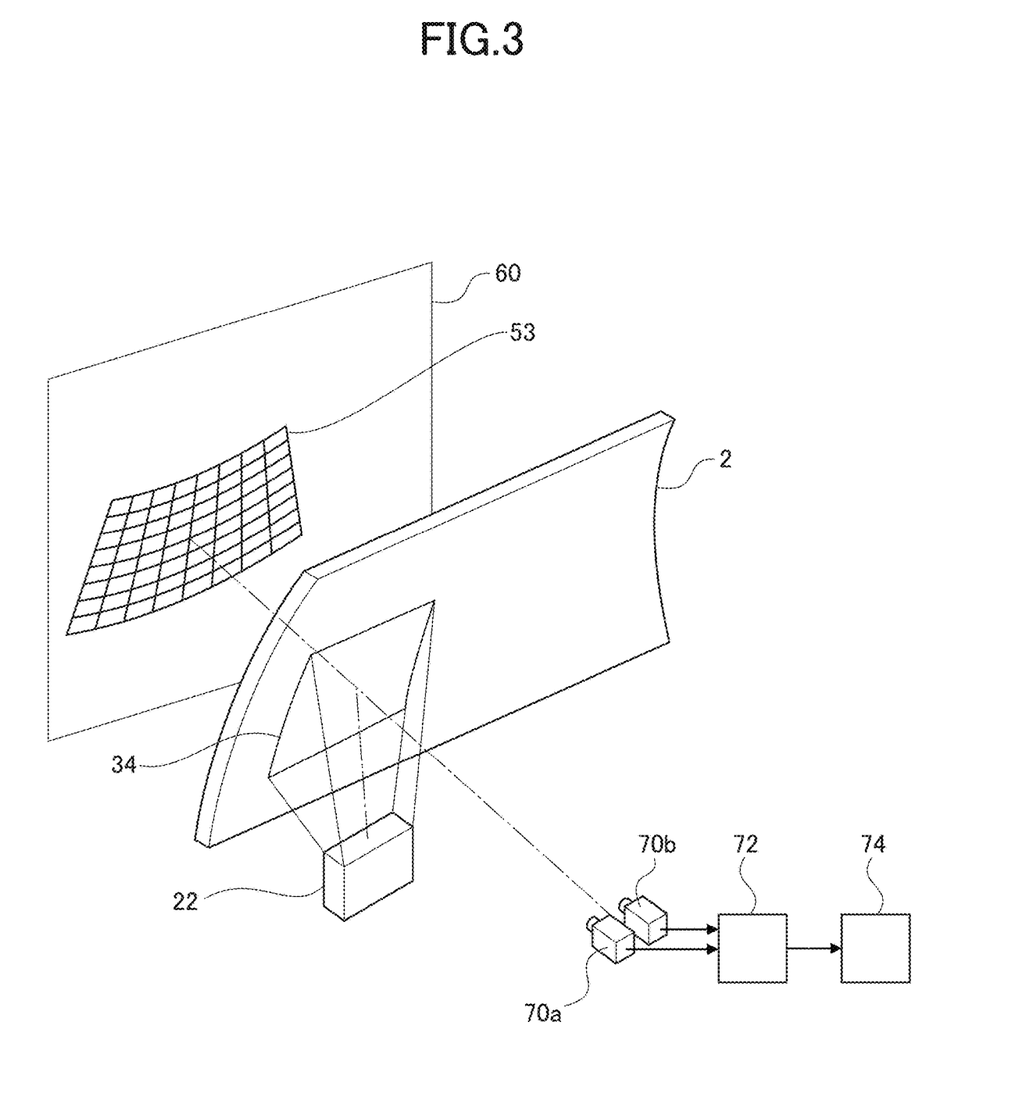
FIG. 3 is a view for explaining the configuration of a device to calculate distortion of a virtual image displayed by the vehicle head-up display apparatus.

FIG. 3 is a view illustrating a configuration of a device to calculate distortion of a virtual image displayed on the vehicle head-up display apparatus 21. The device images the projection pattern 24 projected on a screen 60 by an imaging part 70a disposed at a position corresponding to the driver's left eye and by an imaging part 70b disposed at a position corresponding to the driver's right eye. The device then combines the imaged two virtual images using an image processing part to generate a composite image, and calculates a difference between the positions of the virtual images. The calculation results can be recognized on a display 74. That is, the imaging part 70a and the imaging part 70b are installed within the predetermined eye-position range P.

Figure 4A:
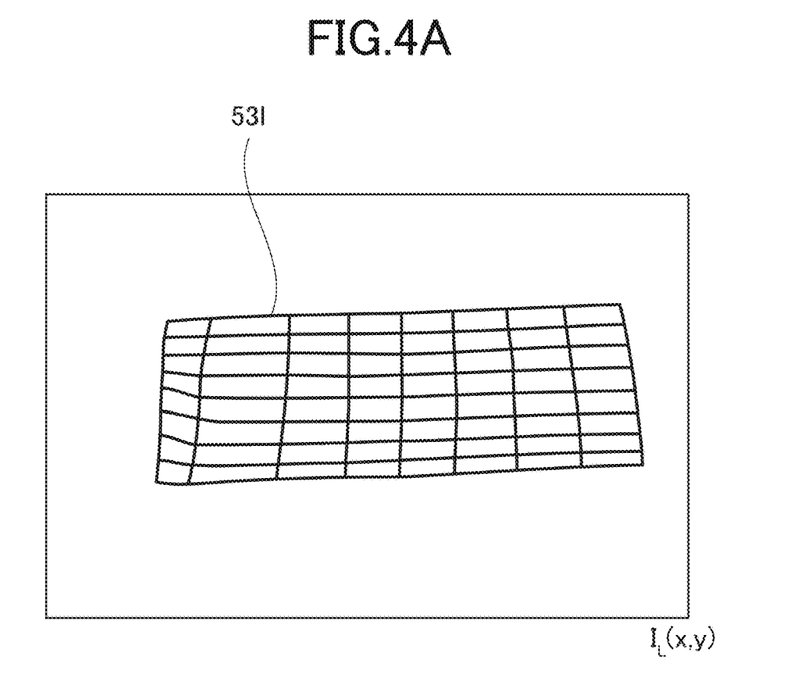
FIG. 4A is a view illustrating an example of a virtual image observed from a position corresponding to a left eye of a driver.
Figure 4B:
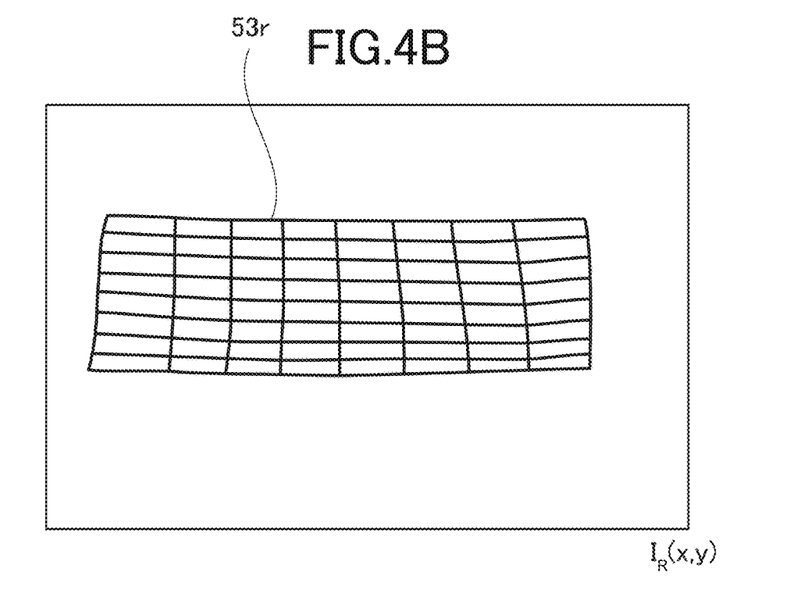
FIG. 4B is a view illustrating an example of a virtual image observed from a position corresponding to a right eye of the driver.

With the device of FIG. 3, an image $I_L$ (x, y) including a virtual image 53l taken by the imaging part 70a and an image $I_R$ (x, y) including a virtual image 53r taken by the imaging part 70b are obtained, as illustrated in FIGS. 4A and 4B.

Figure 5:
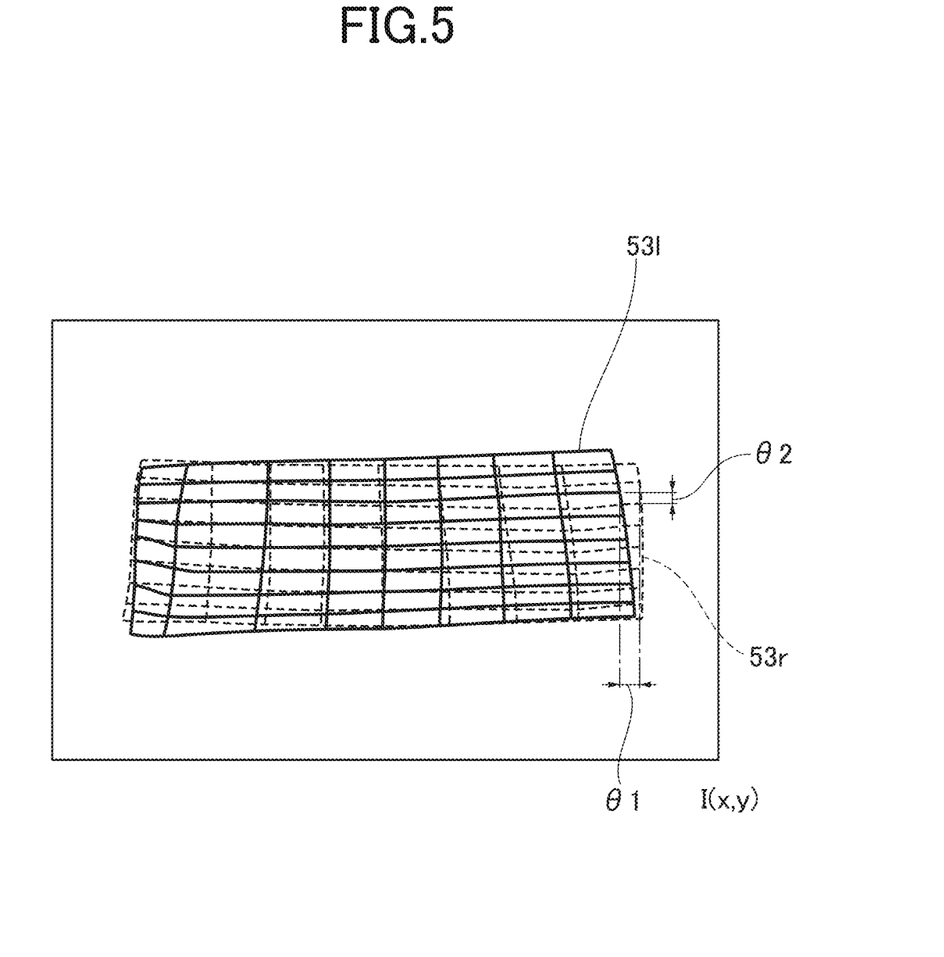
FIG. 5 is a view illustrating the visual images taken by the device of FIG. 3.

The image processing part 72 combines the virtual image 53l and the virtual image 53r at a prescribed position to obtain an image I (x, y) of FIG. 5. The image processing part 72 then calculates positional differences of the virtual image 53l and the virtual image 53r based on the obtained image I (x, y). For example, the image processing part 72 converts a binocular parallax (a difference in distortion θ) into a numerical value based on a positional difference θ1 and a positional difference θ2 shown in FIG. 5.

Figure 6:
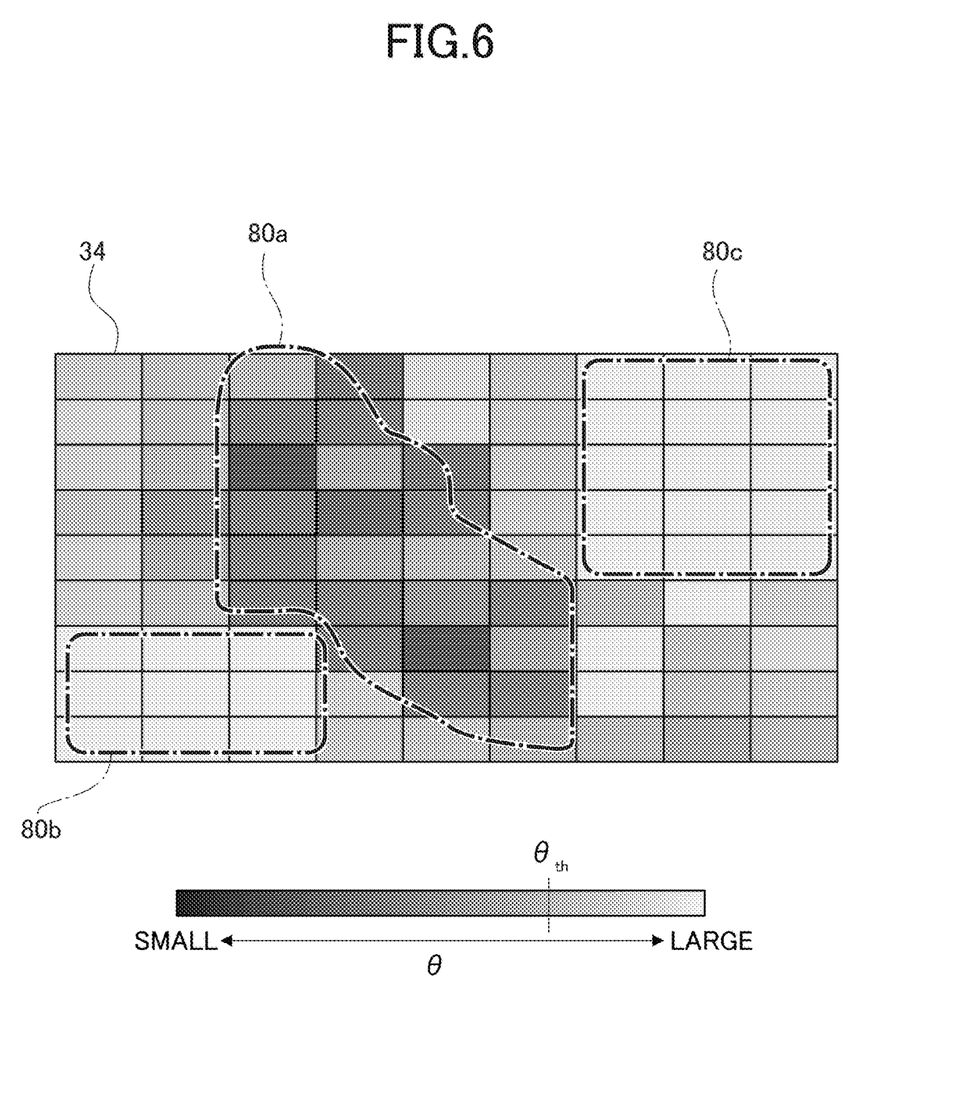
FIG. 6 is a view showing an example of a calculation result for a binocular parallax (a difference in distortion) seen by left and right eyes over an entire display area of the head-up display.

FIG. 6 is a view showing an example of a calculation result for the binocular parallax (the difference in distortion θ) of the virtual images seen by the left and right eyes over the display area 34 of the vehicle head-up display apparatus 21.

As illustrated in FIG. 6, the display area 34 (illustrated in FIG. 3) has nine squares in the vertical direction and nine squares in the horizontal direction. Each of the squares stores a contrast value that represents the binocular parallax (the difference in distortion θ) of each lattice point K1 to K81 in the projection pattern 24 illustrated in FIG. 2. Specifically, the darker the black color represents, the less the difference in distortion θ is; while the thicker the white color represents, the greater the difference in distortion θ is.

In the example of FIG. 6, the center part of the display area 34 of the vehicle head-up display apparatus 21 corresponds to a traveling lane and forms an area 80a having a small difference in distortion θ. Further, the lower-left area corresponding to the edge of the traveling lane or to the opposite lane forms an area 80b having a large difference in distortion θ. Also, the upper-right area corresponding to a road shoulder forms an area 80c having a large difference in distortion θ.

The distribution of the areas 80a, 80b, and 80c differs dependent on the shape of the windshield glass 2, the specifications of the optical-path forming parts 25 and 26, the layout of the casing 22 and the windshield glass 2, and the like. In the distribution of FIG. 6 obtained in the structure of FIG. 3, the lower-left area where the curvature of the windshield glass 2 is greater than a predetermined curvature and the upper-right area where the distance from the casing 22 to the windshield glass 2 is greater than those in the other areas in the display area 34 have large differences in distortion θ. Further, the center part where the windshield glass 2 has a relatively flat surface in the display area 34 has a small difference in distortion θ.

In order to facilitate the following description, the area 80a having a small difference in distortion θ will be referred to as a first area and the entire display area 34 will be referred to as a second area.

Note that the distribution of the differences in distortion θ shown in FIG. 6 is obtainable from a positional resolution corresponding to the number of the lattice points in the projection pattern 24 of FIG. 2. That is, the more the lattice points in a projection pattern 24 are, the higher the positional resolution for the distribution of the difference in distortion θ is achieved.

[Description of Arrangement for Display Contents in Accordance with Distortion of Virtual Image]

Figure 7:
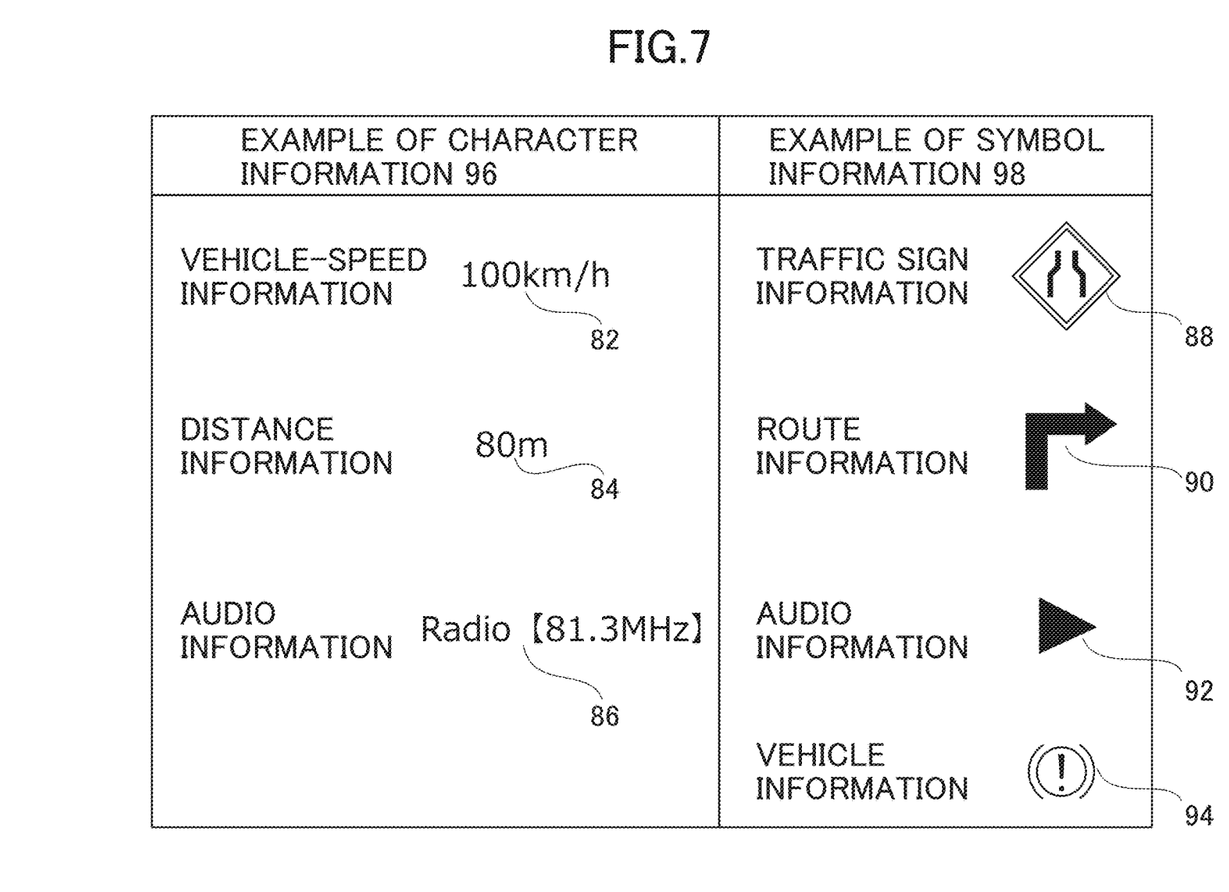
FIG. 7 is a view showing an example of character information and symbol information displayed on the head-up display.

FIG. 7 is a view showing an example of display contents displayed on the vehicle head-up display apparatus 21. As shown in FIG. 7, the vehicle head-up display apparatus 21 displays two kinds of information. One of them is character information 96 which delivers the information by characters (letters), and the other one is symbol information 98 which delivers information with symbols.

The character information 96 includes, for example, vehicle-speed information 82, distance information 84, and audio information 86. The character information 96 delivers the information with numerical values and/or characters. In the character information 96, the character itself has a meaning. That is, the character information 96 should be displayed with a high quality to make it easy to read and to avoid misreading. Therefore, when the character information 96 is displayed as the virtual image 53, the information should be displayed in an area having the difference in distortion θ (a binocular parallax) between the left-eye virtual image 53l and the right-eye virtual image 53r less than a predetermined value θth. In contrary, if the character information 96 is displayed in an area having the difference in distortion θ (a binocular parallax) between the left-eye virtual image 53l and the right-eye virtual image 53r greater than the predetermined value θth, there is a high risk to misread the numerical value and character due to distortion and/or a blurred vision.

Specifically, the character information 96 is displayed in the area, which is in the display area 34 (the second area) of the vehicle head-up display apparatus 21 and has the difference in distortion θ less than the predetermined value θth, namely, in the first area 80a.

On the other hand, the symbol information 98 includes, for example, traffic sign information 88, route information 90, audio information 92, and vehicle information 94. The symbol information 98 delivers the information with symbols (icons). These icons are generalized and designed such that the driver can instantly understand the meanings of the icons at a glance. The symbol information 98 may be displayed in an area having the difference in distortion θ between the left-eye virtual image 53*l* and the right-eye virtual image 53*r* greater than a predetermined value θth since it should be able for the driver to recognize the symbols without causing significant deterioration in understanding even if the symbol information is displayed with some distortion. That is, the symbol information 98 may be displayed in any part of the display area 34 (the second area) of the vehicle head-up display apparatus 21.

Figure 8:
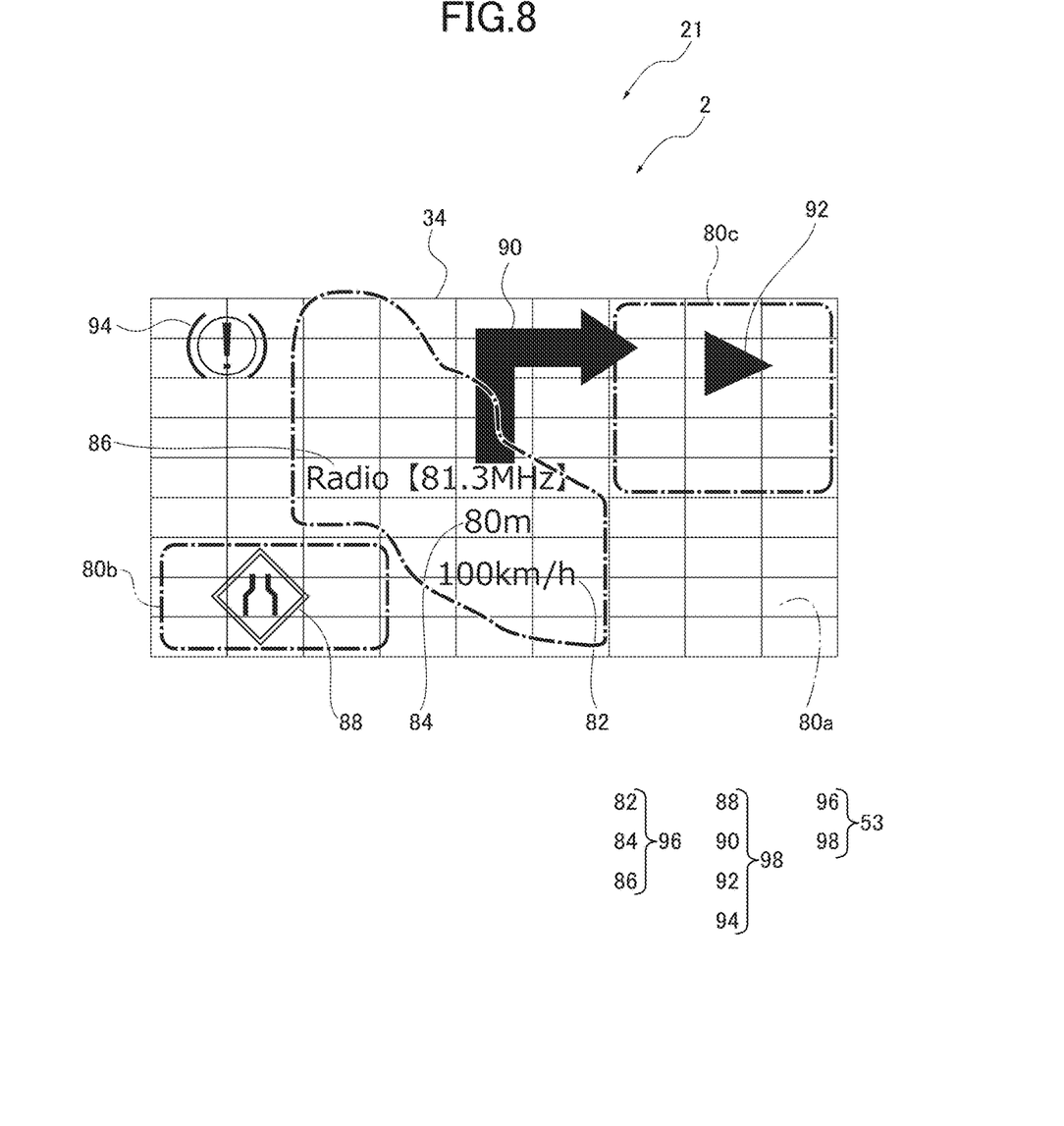
FIG. 8 is a view illustrating an example of an arrangement for the character information and symbol information displayed in the display area of the head-up display shown in FIG. 6.

FIG. 8 is a view illustrating an example of zoning for the display contents in accordance with the above conditions.

As illustrated in FIG. 8, the first area 80*a* of the display area 34, which has the difference in distortion θ less than the predetermined value θth as described with FIG. 6, displays the character information 96 (e.g., the vehicle-speed information 82, the distance information 84, and the audio information 86). The display area 34 (the second area) including the areas 80*b* and 80*c*, in which the difference in distortion θ is greater than the predetermined value θth, displays the symbol information 98 (e.g., the traffic information 88, the route information 90, the audio information 92, and the vehicle information 94).

It is preferable to display all information in the first area 80*a*. However, it is sometimes necessary to display the virtual image 53 in the areas 80*b* and 80*c*, in which the difference in distortion θ is large. The vehicle head-up display apparatus 21 of this embodiment achieves appropriate arrangement (zoning) of the display information without causing deterioration in the visibility in the display area 34 by displaying the symbol information 98 in the areas 80*b* and 80*c*.

Next, Second Embodiment of a vehicle head-up display apparatus 21 according to the invention will be described with reference to the drawings.

Second Embodiment

Figure 9:
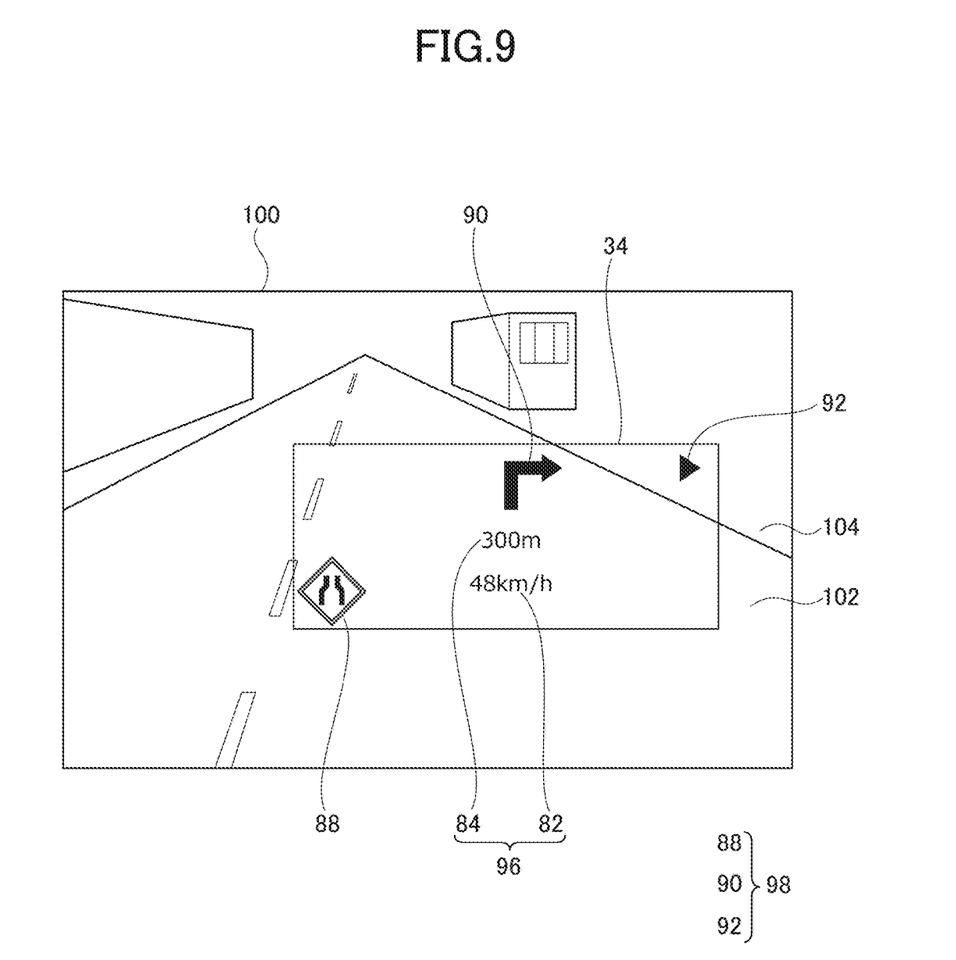
FIG. 9 is a view illustrating an example of a virtual image in a visual field of the driver displayed by the vehicle head-up display apparatus according to Second Embodiment of this invention.

FIG. 9 is a view illustrating an example of a virtual image displayed in the vehicle 10 installed with the vehicle head-up display apparatus 21 as described in First Embodiment.

FIG. 9 illustrates the display area 34, in which the vehicle head-up display apparatus 21 displays the virtual image, in a visual field 100 of the driver.

As illustrated in FIG. 9, the center of the display area 34 is in a position corresponding to a traveling lane 12 of the vehicle 10 and displays vehicle information 82 and distance information 84 as character information 96. The peripheral part of the display area 34 displays symbol information 98. In the example of FIG. 9, traffic sign information 88 is displayed at a position corresponding to an edge of the traveling lane 102, and audio information 92 is displayed at a position corresponding to a road shoulder 104. Further, route information 90 is displayed at the upper edge part in the display area 34.

By arranging (zoning) the character information 96 and symbol information 98 as described above, it becomes possible to achieve a high visibility for both of the virtually displayed character information 96 and symbol information 98. That is, as described in First Embodiment, the character information 96 is displayed around the center part of the display area 34 as the part has small distortion of the virtual image. With this, it achieves a high visibility of the character information 96. Further, the symbol information 98 is displayed in the peripheral part of the display area 34, in which the distortion of the virtual image is relatively larger, as the symbol information 98 has less deterioration in recognizing the information against distortion or a blurred vision.

As described above, the vehicle head-up display apparatus 21 according to First Embodiment is configured to project the display image displayed on the image displaying part 23*a* installed in the instrument panel 3 of the vehicle 10 toward the windshield glass 2 (the translucent member) through the opening 29 of the instrument panel 3. The projected image is then reflected on the windshield glass 2 and forms the character information 96 and the symbol information 98 that is recognizable from the predetermined eye-position range P. The character information 96 is displayed in the first area 80*a*, in which the difference in distortion θ (the binocular parallax) of the virtual image is less than the predetermined value as seen from the predetermined eye-position range P. As a result, it is possible to secure a high visibility without deterioration in the visibility of the character information 96 caused by distortion of a blurred vision.

Further, regardless of the difference in distortion (the binocular parallax), the symbol information 98 is displayed in the display area 34 where the projection light is projected. That is, the areas 80*b* and 80*c*, in which the difference in distortion θ (the binocular parallax) of the virtual image is larger than the predetermined value, display the symbol information 98 since the symbol information 98 has a small deterioration in the visibility even if the difference in distortion θ exceeds the predetermined value θth. Accordingly, regardless of the types of the information to be displayed, it is possible to minimize the deterioration in the visibility caused by the difference in distortion θ (the binocular parallax) of the virtual image 53. The vehicle head-up display apparatus 21, therefore, achieves appropriate arrangement (zoning) of the display information without causing deterioration in the visibility in the display area 34.

Further, in the vehicle head-up display apparatus 21 according to First Embodiment, the first area 80*a* is a flat surface of the windshield glass 2 (the translucent member). That is, the character information 96 is displayed in an area having a small difference in distortion θ (the binocular parallax) of the virtual image. As a result, it is possible to secure a high visibility of the character information.

Further, in the vehicle head-up display apparatus 21 according to First Embodiment, the first area 80*a* is the area corresponding to the traveling lane of the vehicle 10 when seen from the predetermined eye-position range P. That is, the character information 96 is displayed in the area having high frequency in view during the driving such that it can secure a high visibility of the character information.

In the vehicle head-up display apparatus 21 according to Second Embodiment, the character information 96 (the vehicle information 82 and the distant information 84) is displayed at the center part of the display area 34 having a small distortion or a blurred vision in the virtual image since the character information 96 has a large deterioration in the visibility against the distortion or the blurred vision. Further, the symbol information 98 (the traffic sign information 88, the route information 90, and the audio information 92) is displayed in the peripheral part of the display area 34 having a large distortion or a blurred vision in the virtual image since the symbol information 98 has a small deterioration in the visibility against the distortion or the blurred vision. As a result, it is possible to virtually display both the character information 96 and symbol information 98 with a high visibility.

Although the windshield glass 2 of the vehicle 10 is exemplary used as the translucent member in First Embodiment, the translucent member may be a reflection panel (a separately provided combiner) which has translucency and is provided separately from the windshield glass 2.

Although the embodiments of the present invention have been described with reference to the drawings, it should not be limited thereto. It should be appreciated that variations or modifications may be made in the embodiments described by persons skilled in the art without departing from the scope of the present invention as defined by the following claims.

REFERENCE SIGNS LIST

2: Windshield Glass (Translucent Member), 21: Vehicle Head-Up Display Apparatus, 34: Display Area (Second Area), 80*a*: First Area, 80*b* and 80*c*: Area, 53: Virtual Image, 96: Character Information, 98: Symbol Information.

The invention claimed is:

1. A vehicle head-up display apparatus comprising: an image displaying part that is installed in an instrument panel of the vehicle;
   a translucent member that is provided in a front part of a cabin of the vehicle; and
   a display area to which a virtual image is projected by the image displaying part,
   the apparatus being configured to project a display image displayed on the image displaying part toward the translucent member through an opening of the instrument panel, to reflect the projected display image on the translucent member, and to display character information and symbol information in the display area as the virtual image, the virtual image being visible by both eyes from a field of view,
   wherein the display area is divided into a first area and a second area based on a calculation result for binocular parallax of the virtual image seen by left and right eyes such that the binocular parallax in the first area being relatively small in the display area,
   wherein the character information is displayed in the first area when the display area of the translucent member is seen from the field of view.

2. The apparatus according to claim 1, wherein the first area is a flat surface of the translucent member.

3. The apparatus according to claim 1, wherein the first area corresponds to a traveling lane of the vehicle when seen from the field of view.

4. The apparatus according to claim 1, wherein the character information is displayed only in the first area when the display area of the translucent member is seen from the field of view.

* * * * *